United States Patent [19]

Rogers

[11] Patent Number: 5,249,081
[45] Date of Patent: Sep. 28, 1993

[54] OPTICAL APPARATUS FOR SUPERIMPOSING DISPLAYED VISUAL INFORMATION

[75] Inventor: Philip J. Rogers, Clwyd, United Kingdom

[73] Assignee: Pilkington P.E. Limited, United Kingdom

[21] Appl. No.: 763,976

[22] Filed: Sep. 23, 1991

[30] Foreign Application Priority Data

Sep. 29, 1990 [GB] United Kingdom ............... 9021246

[51] Int. Cl.⁵ .......................................... G02B 27/10
[52] U.S. Cl. .................................... 359/633; 359/634; 359/637
[58] Field of Search ............... 359/633, 630, 631, 634, 359/637, 638, 639, 640, 834

[56] References Cited

U.S. PATENT DOCUMENTS

| | | | |
|---|---|---|---|
| 3,732,367 | 5/1973 | Teranishi et al. | 178/6.8 |
| 4,729,634 | 3/1988 | Raber | 350/174 |
| 4,832,449 | 5/1989 | Mundy et al. | 350/286 |

FOREIGN PATENT DOCUMENTS

| | | | |
|---|---|---|---|
| 0202987 | 4/1986 | European Pat. Off. | |
| 380035 | 8/1990 | European Pat. Off. | 359/630 |
| 7122523 | 2/1972 | France | |
| 2559278 | 8/1985 | France | |
| 56-052707 | 7/1981 | Japan | |
| 63-064003 | 8/1988 | Japan | |
| WO84/02197 | 6/1984 | PCT Int'l Appl. | |
| WO89/03059 | 4/1989 | PCT Int'l Appl. | |
| WO89/12840 | 12/1989 | PCT Int'l Appl. | |
| 2006463 | 5/1979 | United Kingdom | |
| 2039383 | 8/1980 | United Kingdom | 359/630 |
| 2088079 | 6/1982 | United Kingdom | |
| 2163869 | 3/1986 | United Kingdom | |
| 2198259 | 6/1988 | United Kingdom | |

OTHER PUBLICATIONS

Abstract New Technology "Liquid Crystal Diffraction Optics HUD" Hughes Aircraft Co., Sep. 1977.
Proceeding of the S.I.D., vol. 19, No. 4, 1978, Los Angeles pp. 169–179 "A Head-up Display for the Future".

*Primary Examiner*—Jon W. Henry
*Attorney, Agent, or Firm*—F. Eugene Davis, IV

[57] ABSTRACT

This invention is concerned with display apparatus of the Head-Up-Display (H.U.D.) type which finds utility in e.g. fighter aircraft. The invention is concerned with providing an H.U.D. which has a profile depth which is substantially and preferably much less than the diameter of the exit lens. The arrangements of the H.U.D. include a cathode ray tube (C.R.T.) display source, a collimating optical means having a plurality of lenses with at least an entrance lens and an exit lens together with a prism and combining means for combining displayed visual information with the view of the scene or object. The prism is so arranged in relationship to the display source that internal reflection of light from the display source within the prism and transmission of light towards the combining means is such as to enable the modular unit profile depth to be between 40% and 60% less than the exit lens diameter. Embodiments are shown which incorporate compensating means to compensate for CRT mechanical axis tilt at an angle with respect to e.g. the aircraft horizontal.

18 Claims, 3 Drawing Sheets

OPTICAL APPARATUS FOR SUPERIMPOSING DISPLAYED VISUAL INFORMATION

BACKGROUND OF THE INVENTION

The present invention relates to optical display apparatus particularly, although not exclusively, for use as a Head-Up-Display in a fighter aircraft.

Head-Up-Display (HUD) optics have been known for many years. The conventional form of a HUD optic is a large lens which magnifies and collimates the display on a small cathode ray tube. This collimated display is then reflected off a partially-reflective combiner situated immediately in front of the pilot. The pilot thus sees information (navigation, engine, weapon etc) superimposed on his line of sight and focussed at infinity. Thus, the pilot can, therefore, assimilate essential information without averting his gaze from the outside world or refocussing his eyes. The latter advantages eliminate the approximately two seconds of 'dead' time that are usually required for averting gaze, focussing on instruments, assimilating information, re-directing gaze to the outside world and refocussing at infinity. This 'dead' time could be extremely dangerous in a fast, low-flying fighter aircraft.

Conveniently, conventional HUD optics comprise folded collimating lenses of the Petzval form, that is two basic groups of positively powered optics separated by a long air-gap in which the folding means (usually a plane mirror) is situated. The folding of the optics enables the mechanical axis of the c.r.t. to be approximately parallel to the over-the-nose sight line of the pilot. The depth or profile depth of a conventional HUD optic is nominally only a little less than the diameter of the HUD exit lens and has not been a problem to date in terms of fit into the aircraft. Modern display technology has, however, enabled large, rugged, flat panel displays to be fitted to aircraft and these require a large area of cockpit facia space. Thus it is now required that HUD optics be substantially reduced in depth in order to provide adequate visibility of these flat panel displays. The requirement for a reasonable instantaneous field of view (IFOV) from the HUD, defined only by simple trigonometry involving the size of the HUD exit lens and its distance from the pilot's eyes, has not been relaxed. There are, therefore, apparently contradictory requirements that the HUD exit lens should be large in diameter (in excess of say 160 mm) but the profile depth of the optic, e.g. the actual physical depth of the box in which the components (c.r.t., folding mirror and collimating lenses) of the optical module are to be accommodated, should be very much less than the exit lens diameter, say 60% of this diameter. This is clearly difficult if not impossible with a conventional optical design.

An aim of this invention is to overcome the beforementioned problems by the provision of a head-up display optic which has a profile depth which is substantially and preferably much less than the diameter of the exit lens.

BRIEF SUMMARY OF THE INVENTION

According to the present invention, there is provided optical apparatus for use for example in an aircraft for superimposing displayed visual information on an observer's (e.g. pilot's) view of a scene or object, comprising a modular optical unit incorporating a display source providing the displayed visual information, collimating optical means having a plurality of lenses with at least an entrance lens and an exit lens, and a prism, and combining means for combining the displayed visual information with the view of the scene or object, wherein the prism is so arranged in relationship to the display source that the internal reflection of light from the display source within the prism and transmission of light from the prism towards the combining means is such as to enable the modular optical unit profile depth to be substantially less than the exit lens diameter. Preferably the prism is used as a triple bounce prism.

Preferably the profile depth is less than 60% of the exit lens diameter and may be 40% of the exit lens diameter.

The prism preferably incorporates a short refracting entrance face through which display source light enters, and two adjacent longer faces one of which is the base of the prism and the other forms a refracting exit face. Three internal reflections of light take place in the prism, two on the base face and one on the refracting exit face while light is transmitted from the prism by way of the refracting exit face.

Preferably the refracting exit face incorporates a wavelength selective dielectric coating, whereas the base face incorporates a highly reflective coating although a dielectric coating may be employed which is highly reflective over the narrow spectral bandwidth of the display source.

Preferably the angle opposite the refracting entrance face between the base face and the refracting exit face is between 20° and 22°.

Preferably the display source comprises a cathode ray tube having a mechanical axis which is tilted at a suitable angle with respect to a given horizontal axis, for example of the aircraft within which the optical apparatus is mounted to avoid infringement of the observer's (pilot's) view of the scene or object. The modular optical unit then includes compensating means for correcting for the effect of the angle at which the mechanical axis of the cathode ray tube is tilted. The compensating means may take the form of a fibre optic wedge forming a face plate for the cathode ray tube. The compensating means may alternatively take the form of wedged optical elements located between the cathode ray tube and the prism means to give non-normal incidence at the prism input face and/or a wedge shaped glass faceplate. The exit lens may also be asymmetrical in form.

The compensating means may also alternatively be a cathode ray tube whose faceplate is not orthogonal to its mechanical axis.

The compensating means may alternatively be a Fresnel lens located between the exit lens and the combining means.

The combining means is preferably of decentered spherical form but may take planar form.

The invention will be more readily understood from the following description of exemplary embodiments which should be read in conjunction with the accompanying drawings in which

DESCRIPTION OF THE PREFERRED EMBODIMENT

Figure 1:
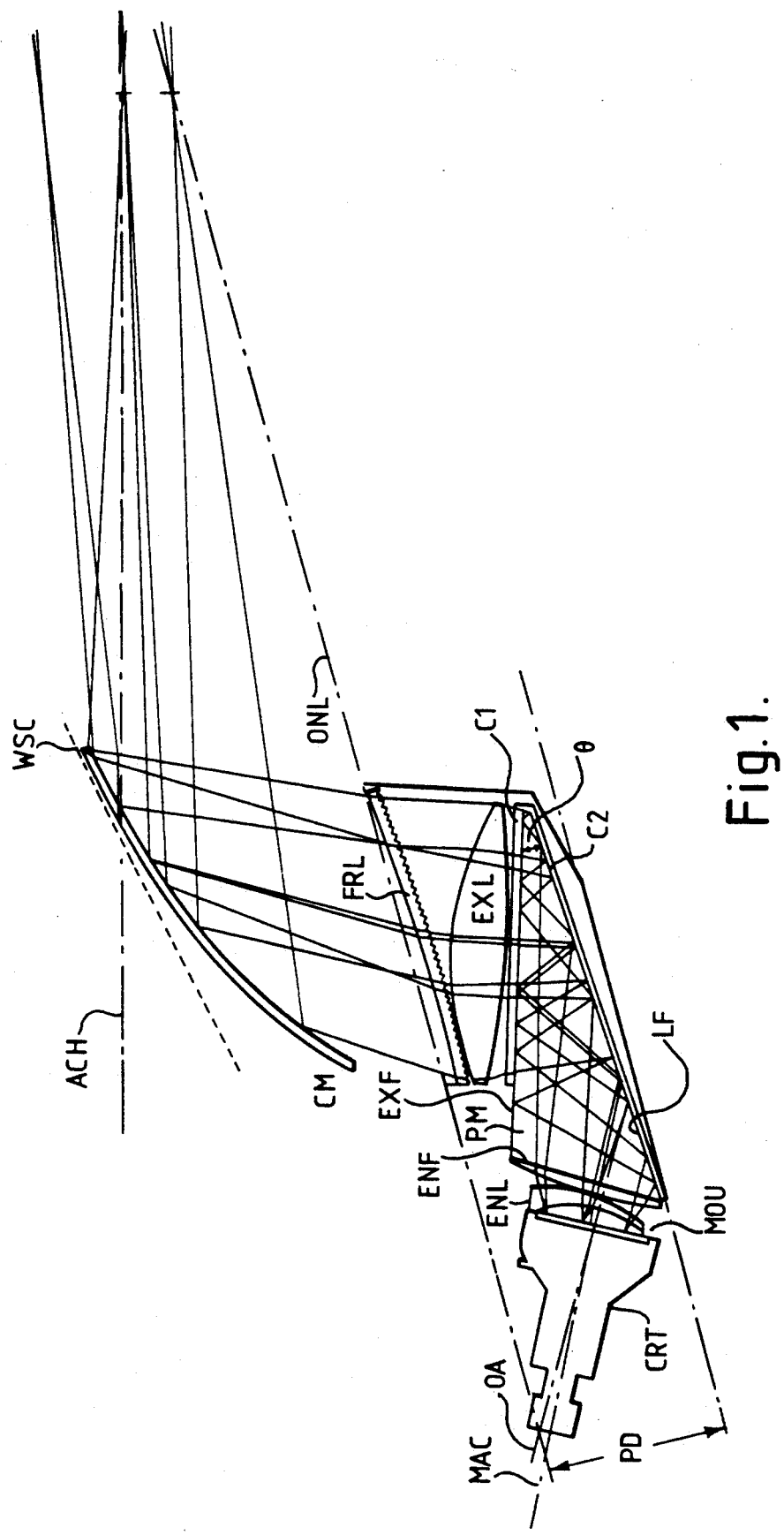
FIG. 1 shows a head-up display system in accordance with this invention.

Referring to the drawings it should be understood that corresponding components in the various embodiments shown in the drawings have been designated identically.

The general objective of this invention is to provide a head-up display HUD optic whose profile depth PD is less than the exit diameter of the optic, at the end of the optic facing the pilot. In particular the profile depth to be achieved is typically less than 60% of the exit lens EXL diameter and would ideally be 40% of the exit lens diameter. Generally the ratio of profile depth to exit lens diameter will be 20% less than a conventional HUD optic employing a single reflection.

The means by which this is achieved involves the use of a narrow angle triple-bounce prism PM mounted within the main modular optical unit MOU of the head-up display which comprises, amongst other things, a display source in the form of a c.r.t., and at least an entrance lens ENL and exit lens EXL which collimate the display image at a partially reflective spherical combining means CM (see FIG. 1) through which the observer/pilot views the outside scene and the display information which is superimposed on the observer's/pilot's line-of-sight and which is focussed at infinity.

The prism has a short refracting entrance face ENF through which the display light enters and two adjacent longer faces LF, EXF. Face LF is the base of the prism while the other face is a refracting exit face EXF. Three internal reflections of light take place in the prism, PM, two on face LF, and one on the exit face EXF which is also used for final transmission of light from the prism. The angle 0 opposite the entrance face ENF between the two longer faces EXF and LF is preferably of the order of 20° to 22°.

Selective reflection/transmission at the longer faces LF, EXL of the prism PM are achieved partially by total-internal-reflection and partially by the use of coatings C1 and C2. Coating C1 is a wavelength selective dielectric coating operating over the bandwidth of the display source, whereas coating C2 is preferably a highly reflective metallic coating. In some circumstances, however, it may be appropriate to use a dielectric coating for C2 which is only highly reflective over the narrow spectral bandwidth of the display source. This acts to reduce the level of solar radiation entering (and exiting in the case of diffuse solar reflection off the display source) the unit.

There is a potential problem with using a triple-bounce prism PM within the HUD optic in that the input optical axis OA, which usually basically defines the mechanical axis MAC of the c.r.t.(the axis which passes centrally and longitudinally through the c.r.t.), is required to be tilted at such an angle with respect to the aircraft horizontal line ACH that the c.r.t. would seriously infringe the over-the-nose sight line ONL of the aircraft and thereby obscure part of the observer's/pilots view of the scene or object. Generally, therefore, the mechanical axis of the c.r.t. has always to be optimised to be tilted at a suitable angle with respect to the aircraft horizontal line ACH to prevent such infringement occurring. This has the effect of causing the optical input from the display source to be out of alignment with the other components of the modular optical unit.

This gives rise to a problem which effectively requires means for compensating or correcting for the effect of the c.r.t. angle to enable satisfactory transmission of the display information through the HUD optic.

This problem is overcome by use of any one of the following solutions:

(a) (see FIG. 3) a fibre-optic wedge FOW which serves as the c.r.t. face plate and is an integral part of the c.r.t..

(b) (see FIG. 2) wedged optical elements W01, W02 between the c.r.t. and prism, non-normal incidence at the prism input face, and possibly a wedged c.r.t. glass faceplate WFP (which may be a standard c.r.t. with a glass wedge cemented onto it). The exit lens may also be asymmetrical. Non-normal incidence at the prism entrance face ENF acts as though there was a wedge prism in contact with the prism. This arrangement contributes to the tilting of the mechanical axis.

(c) use of a c.r.t. whose faceplate is not orthogonal to its mechanical axis (not shown), the display output being corrected in these circumstances electronically within the c.r.t.

(d) (see FIG. 1) use of a Fresnel FRL lens positioned above the exit lens EXL, i.e. between the exit lens EXL and the combiner CM.

The combination of the triple-bounce prism PM together with a dielectric coating on its exit face EXF together with one of the means of correcting c.r.t. angle, can provide a large diameter HUD optic of quite a small profile depth PD. Preferably to keep the HUD exit lens EXL as narrow (thin) as possible the lens employed is a single glass aspheric. A filtered narrow-band c.r.t. phosphor (P43 or P53) is also employed to reduce chromatic effects.

It is important to note that the dielectric coating C1 may not be required if the HUD optic is truncated to a certain extent.

Referring to FIG. 1, the modular optical unit MOU employs a standard small c.r.t. and the mechanical axis MAC of the c.r.t. is so angled with respect to the over-the-nose line ONL to ensure that this line is not seriously infringed. As a consequence of this, the display information from the c.r.t., which is reflected within the prism PM and then transmitted therefrom is not transmitted towards the combining means CM at the necessary angle to be reflected to the observer. To overcome this problem a suitable Fresnel lens FRL is employed between the exit lens EXL and the combiner CM as mentioned above.

In FIG. 1 the chain dotted line designated WSC represents the windscreen clearance.

Figure 2:
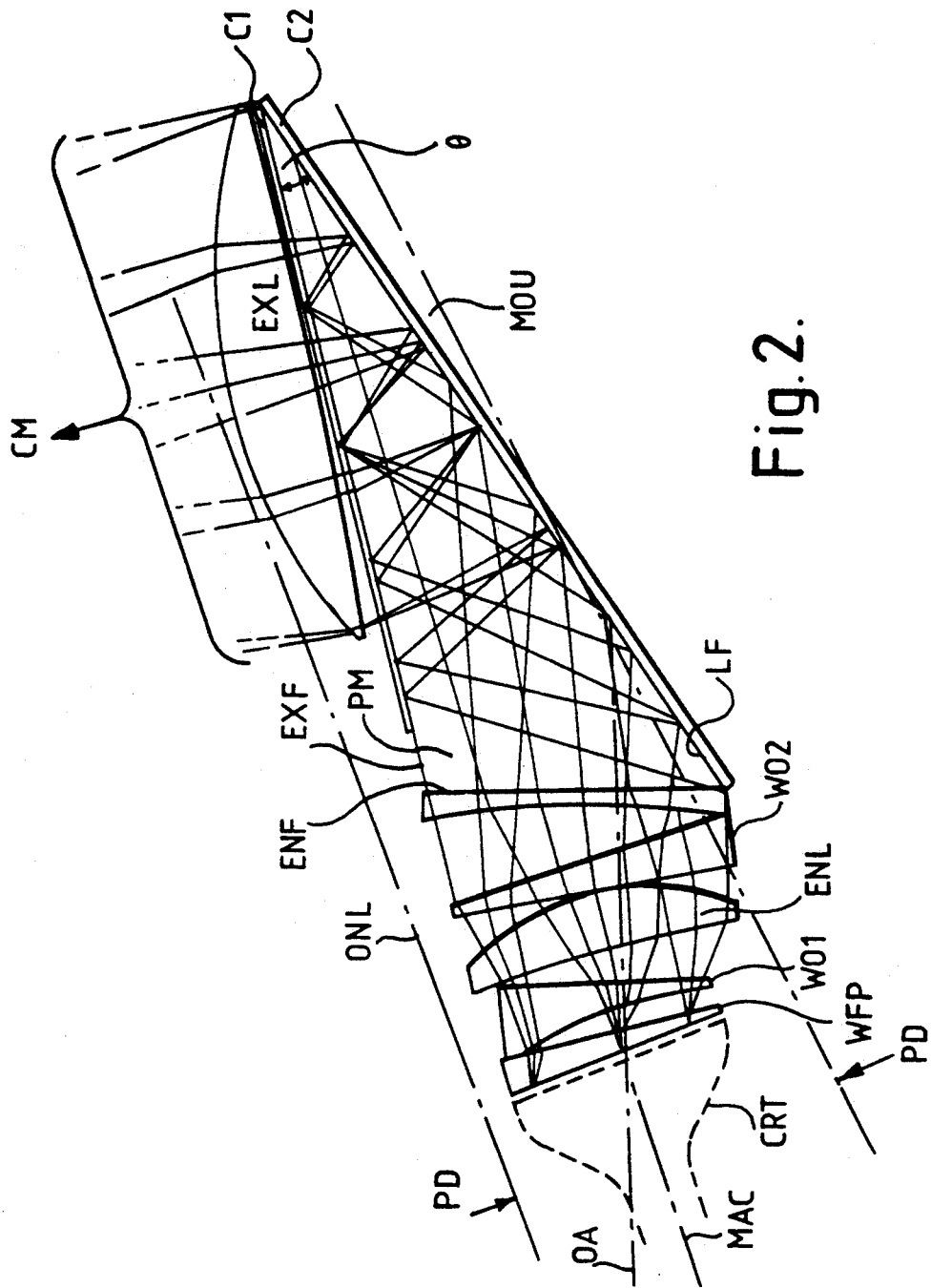
FIG. 2 shows a portion of a head-up display system in accordance with an alternative form of this invention; and, FIG. 3 shows a portion of a head-up display system in accordance with a further alternative form of this invention.

Referring now to FIG. 2, which shows a typical arrangement of a modular optical unit MOU employing asymmetrical optical elements WFP, W01 and W02, wedged, tilted or decentred to overcome the problem caused by the angle of the mechanical axis of the c.r.t. Such optical elements may naturally be located anywhere in the HUD optical system to obtain the necessary effect. It will further be understood tht such wedged, tilted or decentered components may or may not be powered. By way of example, FIG. 1 shows a wedged entrance lens ENL.

Figure 3:
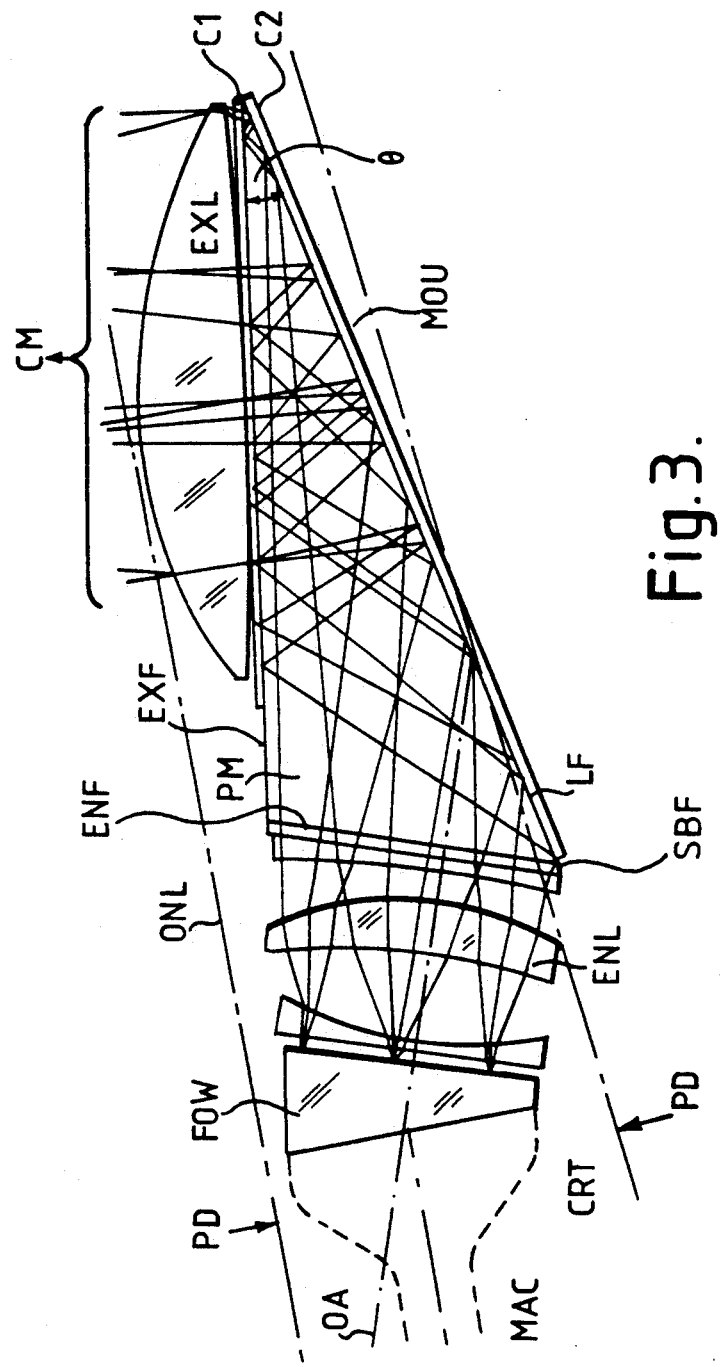

A further typical arrangement of the modular optical unit MOU is shown in FIG. 3. In this arrangement, to overcome the problem caused by the angle of the mechanical axis of the c.r.t., a fibre optic wedge FOW is employed which abuts the face of the c.r.t..

In the FIG. 3 arrangement a side band filter SBF is included on the entrance face ENF of the prism. This is provided for removing the side bands of the narrow band phosphor of the display. Such a filter, although not shown in the arrangements of FIG. 1 and FIG. 2, may be used in these arrangements if required.

It should be noted that in the arrangements of FIG. 2 and FIG. 3, the combining means CM is not shown, however, it should be understood that the combiners will take the general form of that shown in FIG. 1. These combiners, while shown as of decentered spherical form may also take a planar form if required.

While the display source employs a cathode ray tube other forms of display could be employed, for instance a rear-illuminated LCD display or other flat panel display device.

What is claimed is:

1. Optical apparatus for use for superimposing displayed visual information on an observer's view of a scene or object, comprising in combination;
    a modular optical unit incorporating a display source providing the displayed visual information; collimating optical means having a plurality of lenses with at least an entrance lens and an exit lens, the optical axes of the entrance and exit lenses being mutually inclined; a beam-folding prism having 3 faces being disposed between the entrance and exit lenses; and,
    combining means for combining the displayed visual information with the view of the scene or object, wherein the prism is so arranged in relationship to the display source that it is a triple bounce prism wherein the internal reflection of light from the display source within the prism and transmission of light from the prism towards the combining means is such that the modular optical unit profile depth is substantially less than the exit lens diameter.

2. Optical apparatus as claimed in claim 1, wherein the prism incorporates a short refracting entrance face through which display source light enters from the entrance lens, and two adjacent longer faces one of which is the base of the prism and the other forms a refracting exit face and wherein three internal reflections of light take place in the prism, two on the base face and one on the refracting exit face while light is transmitted from the prism by way of the refracting exit face.

3. Optical apparatus as claimed in claim 2, wherein the refracting exit face incorporates a wavelength selective dielectric coating.

4. Optical apparatus as claimed in claim 2, wherein the base face incorporates a highly reflective coating.

5. Optical apparatus as claimed in claim 2, wherein the base face incorporates a dielectric coating which is highly reflective over the narrow spectral bandwidth of the display source.

6. Optical apparatus as claimed in claim 2, wherein the angle opposite the refracting entrance face between the base face and the refracting exit face is between 20° and 22°.

7. Optical apparatus as claimed in claim 1, wherein the display source comprises a cathode ray tube having a mechanical axis which is tilted at a suitable angle with respect to a given horizontal axis to avoid infringement of the observer's view of the scene or object.

8. Optical apparatus as claimed in claim 7, wherein the modular optical unit includes compensating means for correcting for the effect of the angle at which the mechanical axis of the cathode ray tube is tilted.

9. Optical apparatus as claimed in claim 8, wherein the compensating means takes the form of a fibre optic wedge forming a face plate for the cathode ray tube.

10. Optical apparatus as claimed in claim 8, wherein the compensating means takes the form of wedged optical elements located between the cathode ray tube and the prism means to give non-normal incidence at the prism input face and/or a wedge shaped glass faceplate.

11. Optical apparatus as claimed in claim 8, wherein the compensating means comprises a cathode ray tube whose faceplate is not orthogonal to its mechanical axis.

12. Optical apparatus as claimed in claim 8, wherein the compensating means comprises a Fresnel lens located between the exit lens and the combining means.

13. Optical apparatus as claimed in claim 1, wherein the combining means is of decentered spherical form.

14. Optical apparatus as claimed in claim 1, wherein the combining means takes a planar form.

15. Optical apparatus as claimed in claim 1, wherein the exit lens is asymmetrical in form.

16. Optical apparatus as claimed in claim 1, wherein the profile depth is less than 60% of the exit lens diameter.

17. Optical apparatus as claimed in claim 1, wherein the profile depth is less than 40% of the exit lens diameter.

18. Optical apparatus as claimed in claim 2, wherein the angle between the base face and the refracting exit face is between 20° and 22°.

* * * * *